United States Patent
Arao et al.

(10) Patent No.: US 11,068,831 B2
(45) Date of Patent: Jul. 20, 2021

(54) WORK ANALYSIS ASSISTANCE DEVICE, WORK ANALYSIS ASSISTANCE METHOD, COMPUTER PROGRAM, AND INFORMATION STORAGE MEDIUM

(71) Applicant: Broadleaf Co., Ltd., Tokyo (JP)

(72) Inventors: Takahide Arao, Tokyo (JP); Akira Ooka, Tokyo (JP)

(73) Assignee: Broadleaf Co., Ltd., Tokyo (JP)

( * ) Notice: Subject to any disclaimer, the term of this patent is extended or adjusted under 35 U.S.C. 154(b) by 216 days.

(21) Appl. No.: 16/077,925

(22) PCT Filed: Jan. 26, 2017

(86) PCT No.: PCT/JP2017/002675
§ 371 (c)(1),
(2) Date: Aug. 14, 2018

(87) PCT Pub. No.: WO2017/145628
PCT Pub. Date: Aug. 31, 2017

(65) Prior Publication Data
US 2020/0293972 A1 Sep. 17, 2020

(30) Foreign Application Priority Data
Feb. 22, 2016 (JP) .............................. JP2016-030854

(51) Int. Cl.
*G06K 9/00* (2006.01)
*G06Q 10/06* (2012.01)

(52) U.S. Cl.
CPC ... *G06Q 10/06398* (2013.01); *G06K 9/00335* (2013.01); *G06K 9/00711* (2013.01); *G06K 9/00771* (2013.01)

(58) Field of Classification Search
CPC ......... G06Q 10/06398; G06K 9/00335; G06K 9/00711; G06K 9/00771
(Continued)

(56) References Cited

U.S. PATENT DOCUMENTS 7,027,621 B1 * 4/2006 Prokoski ............ G06K 9/00248
                                                         180/272
9,251,598 B2 * 2/2016 Wells ...................... G06T 7/292
(Continued)

FOREIGN PATENT DOCUMENTS

| JP | 04-046749 A | 2/1992 |
| JP | 2000-180162 A | 6/2000 |

(Continued)

OTHER PUBLICATIONS

International Search Report dated Mar. 21, 2017 for corresponding PCT Application No. PCT/JP2017/002675
(Continued)

*Primary Examiner* — Jonathan S Lee
(74) *Attorney, Agent, or Firm* — Michael Best & Friedrich LLP

(57) ABSTRACT

A motion pattern of a worker is evaluated in consideration of a proficiency level of the worker with respect to a work. A pattern acquisition unit (12) that acquires a motion pattern when a worker executes a work, an evaluation standard setting unit (15) that sets an evaluation standard for the motion pattern, and a pattern evaluation unit (18) that evaluates the motion pattern on the basis of the evaluation standard are provided, and the evaluation standard setting unit (18) sets the evaluation standard for the motion pattern when a certain worker executes certain work according to the number of times of execution of the certain work executed by the certain worker.

6 Claims, 8 Drawing Sheets

(58) Field of Classification Search
USPC .......................................................... 382/107
See application file for complete search history.

(56) References Cited

U.S. PATENT DOCUMENTS

| | | | | |
|---|---|---|---|---|
| 9,524,426 | B2* | 12/2016 | Kim | G06K 9/00369 |
| 10,325,485 | B1* | 6/2019 | Schuster | G01S 17/88 |
| 10,431,108 | B2* | 10/2019 | Chestnut | G09B 19/003 |
| 10,679,307 | B2* | 6/2020 | Dewait | G06Q 10/063114 |
| 2006/0193262 | A1* | 8/2006 | McSheffrey | H04Q 9/00 370/241 |
| 2010/0094687 | A1* | 4/2010 | Waggaman, III | G06Q 10/06 705/7.42 |
| 2011/0208558 | A1 | 8/2011 | Wakita | |
| 2012/0146789 | A1* | 6/2012 | De Luca | H04N 3/38 340/540 |
| 2015/0269427 | A1* | 9/2015 | Kim | G06K 9/6269 348/159 |
| 2015/0287200 | A1 | 10/2015 | Kokubun et al. | |
| 2016/0070991 | A1* | 3/2016 | Galera | G06T 7/60 348/77 |

FOREIGN PATENT DOCUMENTS

| | | |
|---|---|---|
| JP | 2000-354943 A | 12/2000 |
| JP | 2003-058231 A | 2/2003 |
| JP | 2004-310210 A | 11/2004 |
| JP | 2005-250990 A | 9/2005 |
| JP | 2005-346274 A | 12/2005 |
| JP | 2015-228123 A | 12/2015 |
| KR | 10-2010-0052408 A | 5/2010 |

OTHER PUBLICATIONS

Extended European Search Report (EESR) dated Jan. 7, 2019 for the corresponding European patent application No. EP17756070.3.
Stiefmeier, Thomas et al. "Wearabie Activity Tracking in Car Manufacturing." IEEE Pervasive Computing, vol. 7, No. 2, Apr. 11, 2008, pp. 42-50., IEEE Computer Society, USA. Cited in Non-Patent Literature Document No. 1.
Gonsalves, Ray et al. "Human Motion Analysis Using 3D Range Imaging Technology." 2009 Proceedings of the 26th International Symposium on Automation and Robotics in Construction (ISARC 2009), Jun. 27, 2009, pp. 76-85., IAARC, USA. Cited in Non-Patent Literature Document No. 1.
Korean Office Action dated Oct. 21, 2020 for the related Korean patent application No. 10-2018-7027381, with English machine translation.
Communication pursuant to Article 94(3) EPC dated May 6, 2021 for the corresponding European patent application 17756070.3.

* cited by examiner

FIG. 4

| MOTION TIME PERIOD | MOTION DETAILS | MOTION TIME | INVALID TIME |
|---|---|---|---|
| 0:00:00 ~0:00:03 | PACK PRODUCT IN BOX | 3.0sec | 0sec |
| 0:00:03 ~0:00:06 | CLOSE OPENING OF BOX | 2.5sec | 0.5sec |
| 0:00:06 ~0:00:11 | FINISHING WITH TAPE | 4.0sec | 1.0sec |
| ⋮ | ⋮ | ⋮ | ⋮ |

WORK ANALYSIS ASSISTANCE DEVICE, WORK ANALYSIS ASSISTANCE METHOD, COMPUTER PROGRAM, AND INFORMATION STORAGE MEDIUM

CROSS-REFERENCE TO RELATED APPLICATIONS

This application is entering into national phase of PCT Application Number PCT/JP2017/002675, filed on Jan. 26, 2017. Further, this application claims the benefit of priority from Japanese Application Number 2016-030854, filed on Feb. 22, 2016, the entire contents of which are incorporated herein by reference.

TECHNICAL FIELD

The present invention relates to a work analysis assistance device, a work analysis assistance method, a computer program for work analysis assistance, and an information storage medium storing the computer program, and particularly, to a work analysis assistance device, an analysis assistance method, a computer program, and an information storage medium for evaluating a motion pattern of a worker.

BACKGROUND ART

In work analysis, it is already known to specify a motion pattern of a worker. As an example thereof, the technique disclosed in Patent Literature 1 may be exemplified. Patent Literature 1 describes that a track (movement track) of a worker during work is specified as a motion pattern. In addition, Patent Literature 1 describes that a reference path of the work is displayed so as to be superimposed on the specified track. As a result, an analyst can perform evaluation of the motion pattern by, for example, grasping unnecessary movements of the worker or the like.

CITATION LIST

Patent Literature

PATENT LITERATURE 1: JP 2015-228123 A

SUMMARY OF INVENTION

Technical Problem

By the way, in a case where the same worker executes the same work, the motion pattern changes as the work is repeated (specifically, the motion pattern becomes closer to an ideal pattern). For this reason, when evaluating the motion pattern in each work, it is necessary to take into consideration the proficiency level of the worker with respect to the work. Meanwhile, in the work analysis of the related art including Patent Literature 1, the evaluation of the motion pattern in consideration of the proficiency level has not been performed. In this regard, the present invention has been made in view of the above-described problems and an object thereof is to provide a work analysis assistance device and a work analysis assistance method that are capable of taking into consideration a proficiency level of a worker with respect to a work when evaluating a motion pattern of the worker, a computer program for realizing the same, and an information storage medium storing the computer program.

Solution to Problem

In order to solve the above-described problems, according to the present invention, there is provided a work analysis assistance device, including: a pattern acquisition unit that acquires a motion pattern when a worker executes work; an evaluation standard setting unit that sets an evaluation standard for the motion pattern; and a pattern evaluation unit that evaluates the motion pattern on the basis of the evaluation standard, in which the evaluation standard setting unit sets the evaluation standard for the motion pattern when a certain worker executes certain work according to the number of times of execution of the certain work executed by the certain worker.

The above-described work analysis assistance device according to the present invention evaluates the motion pattern of the worker on the basis of the evaluation standard. The evaluation standard for a motion pattern when a certain worker executes the certain work is set according to the number of times of execution of the certain work by the certain worker. Therefore, the proficiency level of the worker is reflected in the evaluation standard, and as a result, it is possible to evaluate the motion pattern in consideration of the proficiency level.

In the above-described work analysis assistance device, the pattern acquisition unit may cause the worker to analyze a video illustrating a state where the worker executes the work and obtain the motion pattern.

In the above configuration, the motion pattern is acquired by analyzing the video showing the state where the worker executes the work. Therefore, it is possible to appropriately acquire the motion pattern.

The work analysis assistance device may further include an input reception unit that receives an input of a determination result with respect to acceptability of the work from which the motion pattern is acquired, in which the input reception unit receives the input of the determination result for each of the motion patterns acquired by the pattern acquisition unit, in which the evaluation standard setting unit sets the evaluation standard on the basis of the determination result for each of the motion patterns, and in which the pattern evaluation unit determines the acceptability of the work from which the motion pattern is acquired as an evaluation for the motion pattern on the basis of the evaluation standard.

With the above configuration, for the acquired motion patterns, the input of the determination result with respect to the acceptability of the work is received. Then, the determination result for each motion pattern is learned, and an evaluation standard is set. In addition, when a new motion pattern is acquired, the acceptability of the work from which the new motion pattern is acquired is determined on the basis of the evaluation standard. As a result, it is possible to appropriately determine the acceptability of the work in accordance with the relationship (correlation) between the motion pattern and the acceptability of the work.

In addition, in the work analysis assistance device, the pattern evaluation unit may calculate the score for the motion pattern on the basis of the evaluation standard as an evaluation for the motion pattern.

In the above configuration, the score for the motion pattern is calculated as an evaluation for the motion pattern. As a result, it is possible to quantitatively evaluate the motion pattern. In addition, for example, by notifying the score to the worker, an opportunity to review the worker's own motion can be given to the worker.

In addition, in the work analysis assistance device, the pattern evaluation unit may specify a degree of dissimilarity between the motion pattern and the reference motion pattern and evaluate the motion pattern on the basis of the degree of dissimilarity and the evaluation standard.

In the above configuration, in evaluating the motion pattern, the motion pattern and the reference motion pattern are compared to specify the degree of dissimilarity between the two patterns. Then, the motion pattern is evaluated on the basis of the specified degree of dissimilarity and evaluation standard. As described above, since the motion pattern is evaluated on the basis of the degree of dissimilarity from the reference motion pattern, it is possible to obtain a more appropriate evaluation result.

In addition, the above-described work analysis assistance device may include: an information acquisition unit that acquires at least one of state information on a state measured when the worker executes the work and environment information on an environment where the worker executes the work; and a pattern prediction unit that predicts the motion pattern on the basis of the information acquired by the information acquisition unit, in which the pattern evaluation unit may evaluate the motion pattern predicted by the pattern prediction unit on the basis of the evaluation standard.

According to the above configuration, the information on the state of the worker and the work environment is acquired, and the motion pattern is predicted on the basis of the acquired information. Then, the predicted motion pattern is evaluated on the basis of the evaluation standard. Therefore, it is possible to predict the motion pattern in a case where the worker executes the work in a certain state or under a certain work environment and the evaluation result on the motion pattern. As a result, for example, it is possible to give an opportunity to improve the state and environment of the worker.

In addition, in order to solve the above-described problems, according to the present invention, there is provided a work analysis assistance method including: a computer acquiring a motion pattern when a worker executes work; the computer setting an evaluation standard for the motion pattern; and the computer evaluating the motion pattern on the basis of the evaluation standard, in which the computer sets the evaluation standard for the motion pattern when a certain worker executes certain work according to the number of times of execution of the certain work executed by the certain worker.

According to the above method, it is possible to evaluate the motion pattern of the worker in consideration of the proficiency level of the worker with respect to the work.

In addition, in order to solve the above-described problems, according to the present invention, there is provided a computer program for causing a computer to function as a work analysis assistance device, in which the computer is caused to function as the work analysis assistance device including: a pattern acquisition unit that acquires a motion pattern when a worker executes work; an evaluation standard setting unit that sets an evaluation standard for the motion pattern; and a pattern evaluation unit that evaluates the motion pattern on the basis of the evaluation standard, in which the computer program causes the computer functioning as the evaluation standard setting unit to set the evaluation standard for the motion pattern when a certain worker executes certain work according to the number of times of execution of the certain work executed by the certain worker.

By causing the computer to execute the computer program according to the present invention described above, it is possible to evaluate the motion pattern of the worker in consideration of the proficiency level of the worker with respect to the work.

In addition, in order to solve the above-described problems, according to the present invention, there is provided a computer-readable information storage medium, storing a computer program for causing a computer to function as a work analysis assistance device including: a pattern acquisition unit that acquires a motion pattern when a worker executes work; an evaluation standard setting unit that sets an evaluation standard for the motion pattern; and a pattern evaluation unit that evaluates the motion pattern on the basis of the evaluation standard, in which the computer program causes the computer functioning as the evaluation standard setting unit to set the evaluation standard for the motion pattern when a certain worker executes certain work according to the number of times of execution of the certain work executed by the certain worker.

By reading the information storage medium according to the present invention described above by a computer, it is possible to evaluate the motion pattern of the worker in consideration of the proficiency level of the worker with respect to the work.

Advantageous Effects of Invention

According to the present invention, it is possible to appropriately evaluate a motion pattern of a worker in consideration of a proficiency level of the worker with respect to a work in a work analysis.

BRIEF DESCRIPTION OF DRAWINGS

FIG. 4 is a diagram illustrating an example of a motion pattern.

DESCRIPTION OF EMBODIMENTS

Hereinafter, each of a work analysis assistance device, a work analysis assistance method, a computer program, and an information storage medium according to the present invention will be described with reference to specific examples. In the following description, "work" denotes a plurality of actions (motions) executed along a series of flows. In addition, a "motion element" corresponds to a constituent unit of work, and in general, one work includes a plurality of motion elements.

A computer program according to the present invention is stored in an information storage medium such as a flash memory or an optical disk readable by a computer and is executed by the computer to cause the computer to function as the work analysis assistance device. The computer corresponds to a general personal computer, a server computer, a smartphone, a personal digital assistant (PDA), or the like. An analyst can use the computer as the work analysis assistance device by activating the computer program according to the present invention loaded on the computer.

Then, the computer serving as the work analysis assistance device has a function of evaluating a behavior (motion) of a worker during work and, specifically, evaluation a motion pattern of the worker in the work. In addition, the motion pattern and the evaluation method thereof will be described in detail later.

Hereinafter, two embodiments will be disclosed as specific embodiments of the present invention, and a configuration and functions of a computer as the work analysis assistance device will be described for each embodiment. In addition, in the following description, a work illustrated in FIG. 1, specifically, work (hereinafter, referred to as the work X) in which a certain worker (hereinafter, referred to as a worker P) inserts a product (not illustrated) into a packing box W that is being conveyed on a conveyor Q and seals the packing box will be analyzed. In addition, the work to be analyzed is not particularly limited, and the present invention may also be applied to the analysis of work different from the above contents of the work.

First Embodiment

Figure 2:
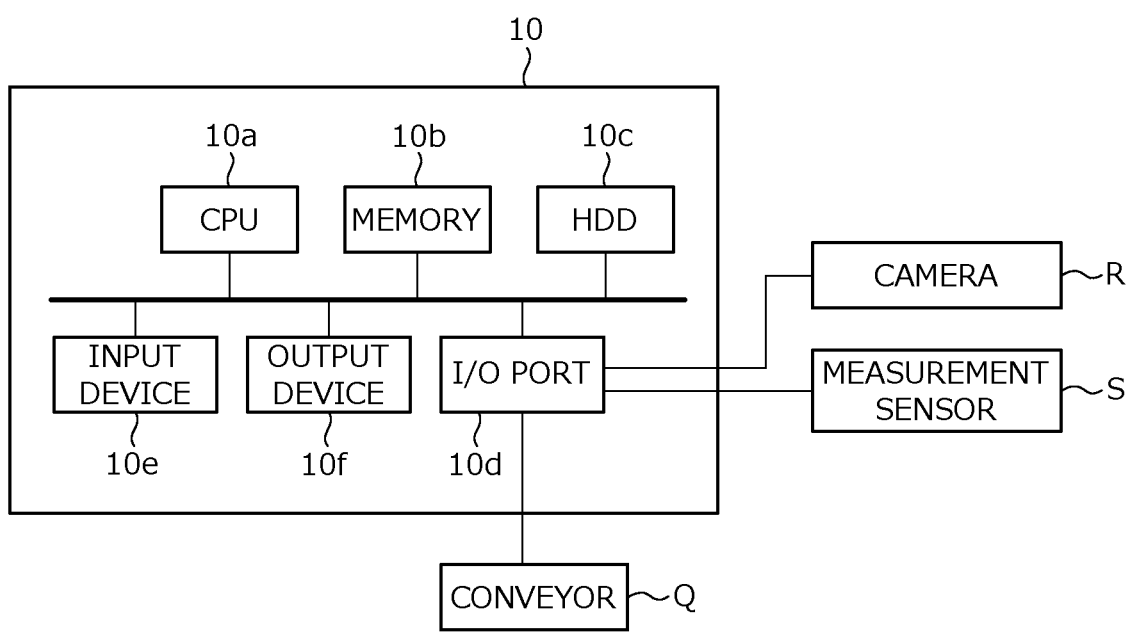
FIG. 2 is a diagram illustrating a configuration example of a computer according to the present invention.

First, a first embodiment will be described. In the first embodiment, as illustrated in FIG. 2, a computer 10 which is a work analysis assistance device includes a CPU 10a, a memory 10b, a hard disk drive 10c (represented as an HDD in the drawing), an I/O port 10d, an input device 10e, and an output device 10f. In addition, a program (hereinafter, referred to as a work analysis assistance program) for causing the computer 10 to function as the work analysis assistance device is installed on the computer 10. The work analysis assistance program corresponds to a computer program according to the present invention.

Figure 1:
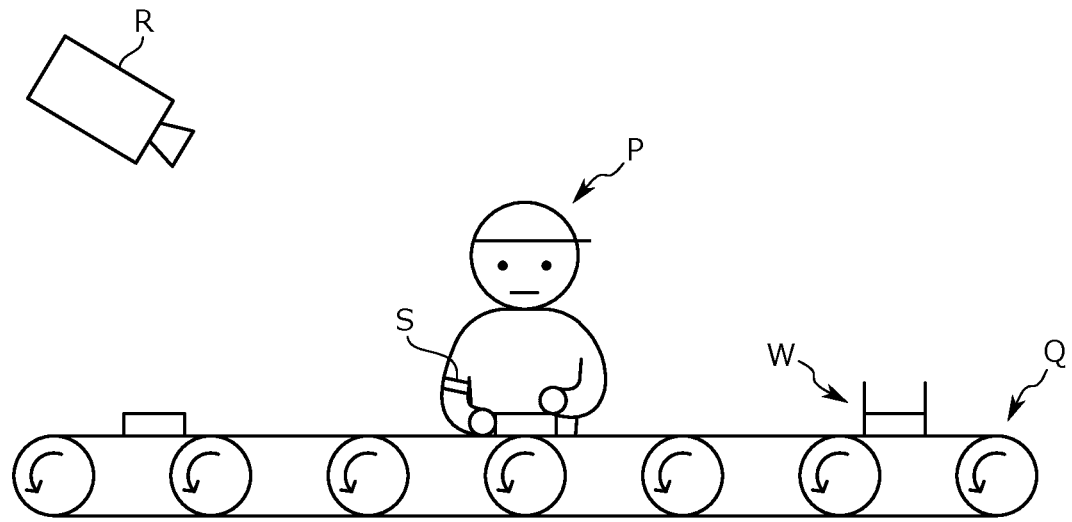
FIG. 1 is a diagram illustrating a state where a certain worker executes certain work.

In addition, the computer 10 acquires a captured video of a camera R and a measurement result of a measurement sensor S through the I/O port 10d. As illustrated in FIG. 1, the camera R captures a state where a worker P executes work X. While the worker P executes the work X, the measurement sensor S measures the information on the state of the worker P, specifically, biometric information (for example, a pulse rate, a body temperature, a muscle action potential, a respiratory volume, a degree of opening of a pupil, or the like) of the worker P. In addition, the computer 10 remotely controls the conveyor Q by outputting a control signal to the transport conveyor Q through the I/O port 10d and adjusts the transport speed thereof.

Figure 3:
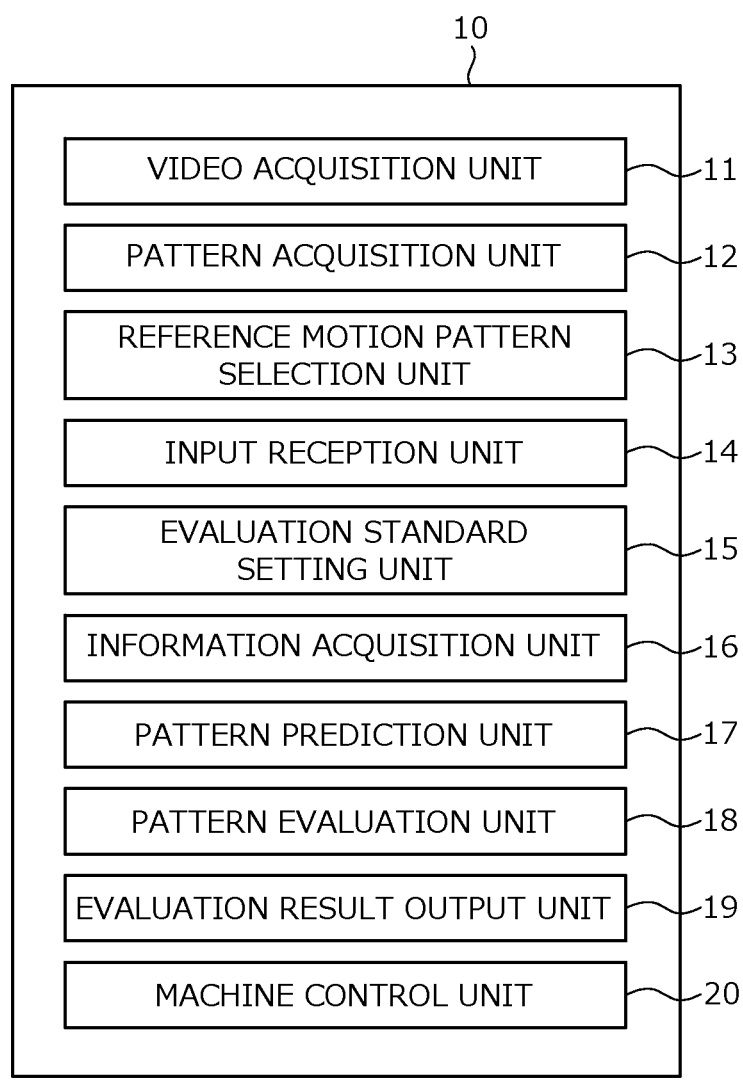
FIG. 3 is a diagram illustrating functions of the computer according to the present invention.

The functions of the computer 10 are described with reference to FIG. 3. The computer 10 includes a video acquisition unit 11, a pattern acquisition unit 12, a reference motion pattern selection unit 13, an input reception unit 14, an evaluation standard setting unit 15, an information acquisition unit 16, a pattern prediction unit 17, a pattern evaluation unit 18, an evaluation result output unit 19, and a machine control unit 20. These functional units are realized by components (hardware) of the computer 10 described above in cooperation with the work analysis assistance program serving as software. Hereinafter, each of the functional units will be described.

The video acquisition unit 11 acquires a captured video from a camera R. In this embodiment, every time the worker P executes the work X, the video acquisition unit 11 acquires the video obtained by capturing the state with the camera R.

The pattern acquisition unit 12 acquires a motion pattern of the worker P in the work X by analyzing the captured video acquired by the video acquisition unit 11. The motion pattern represents details of the motion executed by the worker P during the work X, together with a time when the motion is executed.

In addition, in this embodiment, a motion element table illustrated in FIG. 4 is acquired as an example of the motion pattern. The motion element table is a table of records of a motion time period, details on motion, a motion time, and an invalid time for each motion element constituting the work X. The "motion time period" is a time period in which the motion element is executed, and specifically, the motion time period is a time period from a start time point to an end time point of the motion element. The "details on motion" are specific contents of the motion element. The "motion time" is actual time required for the motion element. The "invalid time" is a time during which a valid motion is not executed in the motion time.

Every time the video acquisition unit 11 acquires the captured video of the camera R, the pattern acquisition unit 12 acquires the motion element table as a motion pattern. In other words, in this embodiment, every time the worker P executes the work X, the motion pattern of the worker P is acquired. The acquired motion pattern is accumulated in the hard disk drive 10c as the motion pattern of the worker P in the work X.

With respect to the motion element table, the recorded contents of the motion element table are not limited to the above-mentioned contents, and may include other contents (for example, a type of the motion element and the like). In addition, as a method of acquiring the motion element table from a work video, a well-known method can be used. For example, a method of acquiring a motion element table by delimiting a work video into motion elements and recording a motion time period, an invalid time, and the like for each motion element may be used.

In addition, the motion pattern may not be limited to the motion element table described above. For example, a movement track when the worker P moves during the work X or representation of a movement (displacement) of each portion of the body of the worker P may be acquired as the motion pattern.

The reference motion pattern selection unit 13 selects as a reference motion pattern one motion pattern from among the motion patterns (strictly speaking, the motion patterns of the worker P in the work X) accumulated in the hard disk drive 10c. The "reference motion pattern" is a motion pattern set as an ideal pattern in the work X. In this embodiment, the reference motion pattern is selected from the motion patterns of the worker P, but the present invention is not limited thereto. For example, a motion pattern of a person other than the worker P, specifically, a person (expert) skilled in the work X may be registered in advance, and such a motion pattern may be used as the reference motion pattern. Alternatively, the reference motion pattern may be theoretically obtained.

The input reception unit 14 receives details input by the analyst through the input device 10e. The input details received by the input reception unit 14 include a determination result with respect to the acceptability of the work X from which the motion pattern (motion element table) is acquired. Specifically, the analyst determines acceptability of the work X executed by the worker P while watching the video of the camera R acquired by the video acquisition unit 11 and inputs the determination result to the input device 10e. The input reception unit 14 receives an input with respect to the acceptability determination result for the work X.

The input reception unit 14 causes the hard disk drive 10c to store the determination result with respect to the acceptability of the work in association with the motion pattern in the work (specifically, work X) to be determined. That is, the input reception unit 14 receives an input of the determination result with respect to the acceptability of the work for each motion pattern acquired by the pattern acquisition unit 12 and causes the hard disk drive 10c to store a set of the determination result and the corresponding motion pattern.

The evaluation standard setting unit 15 sets an evaluation standard for evaluating the motion pattern (motion element table) of the worker P in the work X. In the first embodiment, the evaluation standard setting unit 15 sets a threshold value as the evaluation standard on the basis of the motion pattern acquired by the pattern acquisition unit 12 in the past and the acceptability determination result that is received as an input by the input reception unit 14 for each motion pattern.

Specifically, the evaluation standard setting unit 15 specifies a degree of dissimilarity from the reference motion pattern for each of the motion patterns acquired in the past. The "degree of dissimilarity" is a numerical value (quantified) of a difference between the motion pattern and the reference motion pattern and is specified by adopting a similarity measurement method by, for example, Euclidean distance, Mahalanobis distance, or the like. After specifying the degree of dissimilarity, the evaluation standard setting unit 15 sets, as an input, the degree of dissimilarity from the reference motion pattern obtained for each motion pattern and the acceptability determination result that is received as an input for each motion pattern, and deep learning (strictly speaking, supervised learning) is performed. A threshold value is set as a reference value for determining the acceptability of the work X through the deep learning.

In the first embodiment, the evaluation standard setting unit 15 sets a threshold value as the evaluation standard in the above-described procedure. In addition, the evaluation standard setting unit 15 sets the evaluation standard for the motion pattern of the worker P in the work X according to the number of times (number of times of work execution) of execution of the work X executed by the worker P. Specifically, in a case where the number of times of work execution is N or more (N is a natural number of 2 or more), the evaluation standard setting unit 15 corrects the threshold value set in the above-described procedure. For this reason, the motion pattern acquired after the number of times of work execution reaches N is evaluated on the basis of the corrected threshold value. In addition, the correction method is not particularly limited, but correction may be performed so that the corrected threshold value is lower than the threshold value before correction.

The information acquisition unit 16 acquires biometric information measured by a measurement sensor S. The pattern prediction unit 17 predicts the motion pattern on the basis of the biometric information acquired by the information acquisition unit 16. The predicted motion pattern is a motion pattern that is predicted to be acquired in a case where the worker P executes the work X on the basis of the biometric information acquired by the information acquisition unit 16.

In addition, in predicting the motion pattern, the pattern prediction unit 17 specifies a correlation between the biometric information and the motion pattern. Specifically, the pattern prediction unit 17 specifies a correlation between the biometric information acquired by the information acquisition unit 16 in the past and the motion pattern in the work X executed at the time of measuring the biometric information by a statistical method (for example, regression analysis). Then, when the information acquisition unit 16 newly acquires the biometric information, the pattern prediction unit 17 predicts the motion pattern by introducing the newly acquired biometric information into the above correlation (specifically, a regression formula).

The pattern evaluation unit 18 evaluates the motion pattern acquired by the pattern acquisition unit 12 on the basis of the evaluation standard set by the evaluation standard setting unit 15. Specifically, when the pattern acquisition unit 12 acquires the motion pattern to be evaluated (hereinafter, referred to as the evaluation target pattern), the pattern evaluation unit 18 compares the evaluation target pattern with the reference motion pattern and determines the degree of dissimilarity between the two patterns. After that, the pattern evaluation unit 18 specifies the magnitude relationship between the specified degree of dissimilarity and the threshold value set as the evaluation standard. Then, when the specified degree of dissimilarity is lower than the threshold value, the pattern evaluation unit 18 determines that the work X from which the evaluation target pattern is acquired is good. Conversely, in a case where the specified degree of dissimilarity is equal to or higher than the threshold value, the pattern evaluation unit 18 determines that the work X from which the evaluation target pattern is specified is bad.

The pattern evaluation unit 18 also evaluates the pattern predicted by the pattern prediction unit 17 in the same manner as described above.

The evaluation result output unit 19 outputs through the output device 10f the evaluation result obtained when the pattern evaluation unit 18 evaluates the motion pattern. Specifically, the evaluation result output unit 19 displays the evaluation result on a display (not illustrated) as the output device 10f. In addition, the method of outputting the evaluation result by the evaluation result output unit 19 is not limited to the display on the display. A sound corresponding to the evaluation result may be generated through a speaker or an alarm generator, and a light emitting device may be allowed to emit light by color corresponding to the evaluation result.

The machine control unit 20 controls the transport conveyor Q according to the evaluation result when the pattern evaluation unit 18 evaluates the motion pattern, and the machine control unit adjusts the transport speed of the packing box W on the transport conveyor Q. Specifically, the pattern evaluation unit 18 determines the acceptability of the work X from which the motion pattern is acquired by specifying whether or not the degree of dissimilarity between the motion pattern and the reference motion pattern is equal to or higher than a threshold value, and further evaluates the difference between the degree of dissimilarity and the threshold value. In a case where the difference is equal to or higher than the predetermined value, the machine control unit 20 controls the transport conveyor Q so that the transport speed is increased.

As described above, in this embodiment, in a case where the motion pattern is significantly different from the reference motion pattern, that is, in a case where the motion of the worker P in the work X is different from an ideal movement, the machine control unit 20 adjusts (increases) the transport speed of the transport conveyor Q. As a result, it is possible to forcibly increase the work speed of the worker P and to allow the motion of the worker P to be close to the ideal movement.

Next, an operation example when the computer 10 operates as the work analysis assistance device in the first embodiment will be described. When the analyst performs an operation of activating the work analysis assistance program, the computer 10 receives the activation operation through the input device 10e and functions as a work analysis assistance device. That is, when the work analysis assistance program is activated, the computer 10 executes the above-described functions (specifically, the video acquisition unit 11, the pattern acquisition unit 12, the reference motion pattern selection unit 13, the input reception unit 14, the evaluation standard setting unit 15, the information acquisition unit 16, the pattern prediction unit 17, the pattern evaluation unit 18, the evaluation result output unit 19, and the machine control unit 20).

Then, the computer 10 as the work analysis assistance device executes a series of information processing in order to evaluate the motion pattern of the worker P in the work X. At this time, the computer 10 executes various types of information processing with respect to the motion pattern evaluation in accordance with the work analysis assistance method according to the present invention. That is, the work analysis assistance method according to the present invention is realized by the computer 10 as the work analysis assistance device executing various types of information processing with respect to the motion pattern evaluation.

The information processing by the computer 10 is described in detail. After the work analysis assistance program is activated, three execution modes are presented on a designated screen (not illustrated). The three execution modes presented are a "learning mode", a "pattern evaluation mode", and a "predicted pattern evaluation mode". The analyst designates one mode among the three execution modes presented. Then, the computer 10 as the work analysis assistance device executes the information processing corresponding to the designated execution mode. The information processing in each mode will be individually described below. In the following description, the motion pattern of the worker P in the work X is simply referred to as a "motion pattern".

Figure 5:
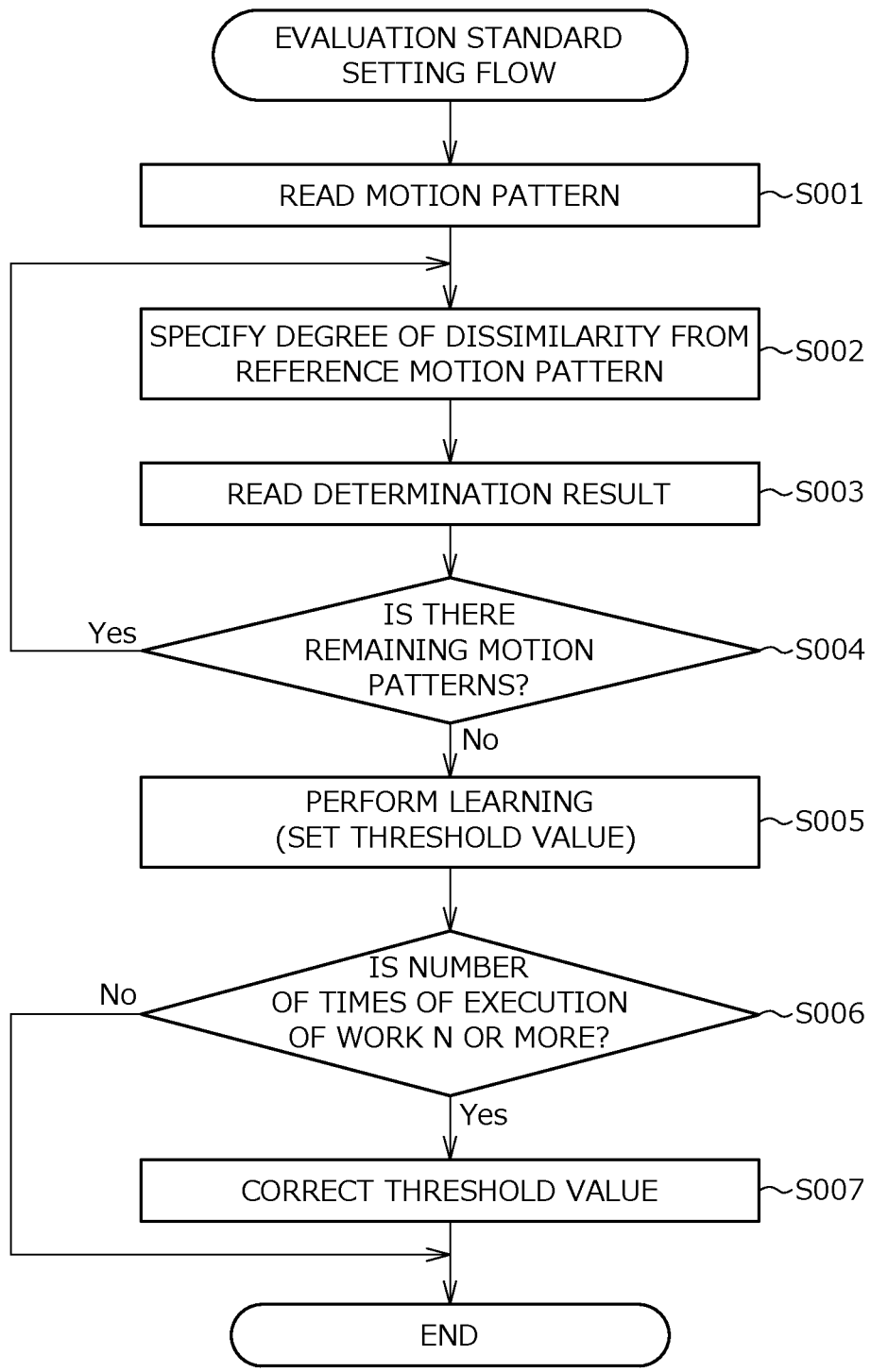
FIG. 5 is a diagram illustrating a flowchart of an evaluation standard setting flow according to a first embodiment.

In a case where the "learning mode" is designated, the computer 10 executes an evaluation standard setting flow illustrated in FIG. 5. This process is a process for setting the threshold value as the evaluation standard by performing depth learning by using a plurality of motion patterns acquired in the past, the reference motion pattern, and the determination result with respect to the acceptability of the work X that is received as an input for each motion pattern.

The evaluation standard setting flow is described with reference to FIG. 5. First, the computer 10 reads the motion pattern acquired in the past from the hard disk drive 10c (S001). In addition, the computer 10 specifies a degree of dissimilarity between the motion pattern read in the previous step S011 and the reference motion pattern (S002). In addition, when the evaluation standard setting flow is performed, an analyst determines a motion pattern to be set as a reference motion pattern and performs a predetermined operation on the input device 10e, and the computer 10 receives the operation, so that the reference motion pattern is selected.

In addition, the computer 10 reads from the hard disk drive 10c the determination result with respect to the acceptability of the work X set together with the motion pattern read out in step S001 (S003). The above steps (S001 to S003) are repeated for all the motion patterns acquired in the past (S004).

After that, the computer 10 executes deep learning with the degree of dissimilarity for each motion pattern specified in step S002 and the determination result for each motion pattern read out in step S003 as inputs (S005). Through the depth learning, the aforementioned threshold value is set. In addition, the computer 10 specifies the number of times of work execution of the work X from the number of motion patterns acquired in the past and determines whether or not the specified number of times of work execution is N or more (S006). In a case where the number of times of work execution is less than N, the threshold value set in the previous step S005 remains unchanged and is used in the pattern evaluation flow and the predicted pattern evaluation flow to be described later.

On the other hand, in a case where the number of times of work execution is N or more, the computer 10 corrects the threshold value set in the previous step S005 according to the number of times of work execution (S007). In a case where the threshold value is corrected as described above, the corrected threshold value is used in the pattern evaluation flow and the predicted pattern evaluation flow.

The evaluation standard flow is ended at the time when all of the above steps are completed (in other words, at the time when the threshold value is determined).

Next, the "pattern evaluation mode" will be described. In a case where the "pattern evaluation mode" is designated, the computer 10 executes the pattern evaluation flow illustrated in FIG. 6. This process is a process for evaluating the motion pattern newly acquired by the computer 10. Specifically, in the pattern evaluation flow according to the first embodiment, on the basis of the details of the motion pattern to be evaluated (hereinafter, referred to as an evaluation target pattern), the acceptability of the work X from which the evaluation target pattern is acquired is determined (strictly speaking, estimated).

Figure 6:
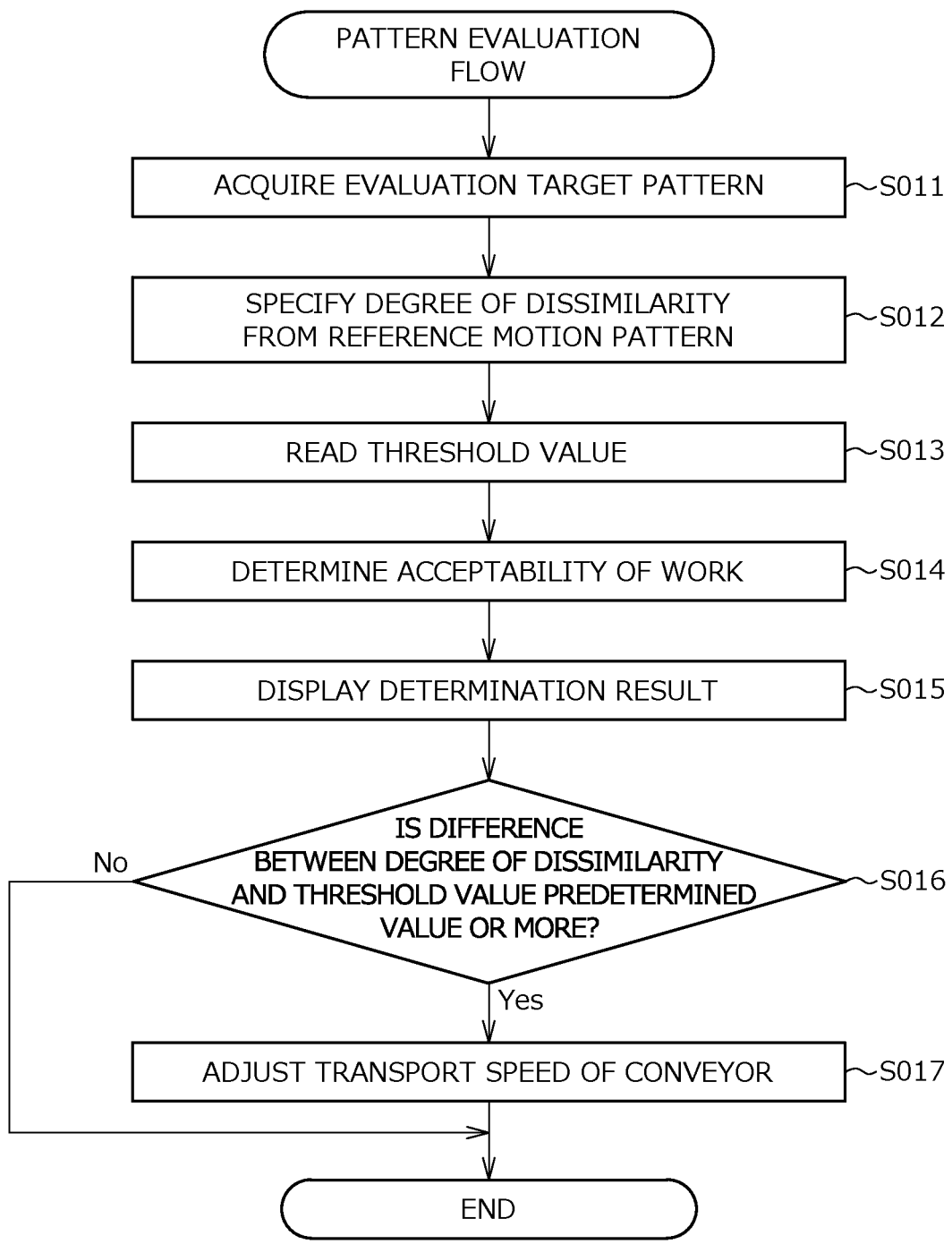
FIG. 6 is a diagram illustrating a flowchart of a pattern evaluation flow according to the first embodiment.

The pattern evaluation flow will be described with reference to FIG. 6. First, the computer 10 analyzes the captured video of the work X newly acquired from the camera R and acquires the motion pattern in the work X as the evaluation target pattern (S011). In addition, the computer 10 specifies the degree of dissimilarity between the evaluation target pattern acquired in the previous step S011 and the reference motion pattern (S012).

After that, the computer 10 reads the threshold value already set in the evaluation standard setting flow (S013). Then, on the basis of the degree of dissimilarity specified in step S012 and the threshold value read in step S013, the computer 10 determines the acceptability of the work X from which the evaluation target pattern is acquired (S014). Specifically, the magnitude relationship between the degree of dissimilarity and the threshold value is specified. When the degree of dissimilarity is lower than the threshold value, the work X is determined to be good, and when the degree of dissimilarity is equal to or higher than the threshold value, the work X is determined to be bad.

After the determination is completed, the computer 10 displays the determination result in the previous step S014 on the display (S015). In addition, the computer 10 obtains a difference between the degree of dissimilarity and the threshold value and determines whether or not the difference is equal to or higher than a predetermined value (S016). When the computer 10 determines that the difference is lower than the predetermined value, the pattern evaluation flow is ended. On the other hand, when it is determined that the difference is equal to or higher than the predetermined value, the computer 10 remotely controls the conveyor Q and adjusts the transport speed so that the transport speed of the conveyor Q is increased (S017). When such adjustment is completed, the pattern evaluation flow is ended.

Next, the "predicted pattern evaluation mode" will be described. When "predicted pattern evaluation mode" is designated, the computer 10 executes the predicted pattern evaluation flow illustrated in FIG. 7. This process is a process for acquiring the biometric information of the worker P from the measurement sensor S, predicting the motion pattern from the acquired biometric information, and evaluating the predicted motion pattern (hereinafter, referred to as a predicted pattern). In the predicted pattern evaluation flow according to the first embodiment, the acceptability of the work X (that is, the work X in the stage before or during the execution), from which the predicted pattern is expected to be acquired in the future, is determined.

Figure 7:
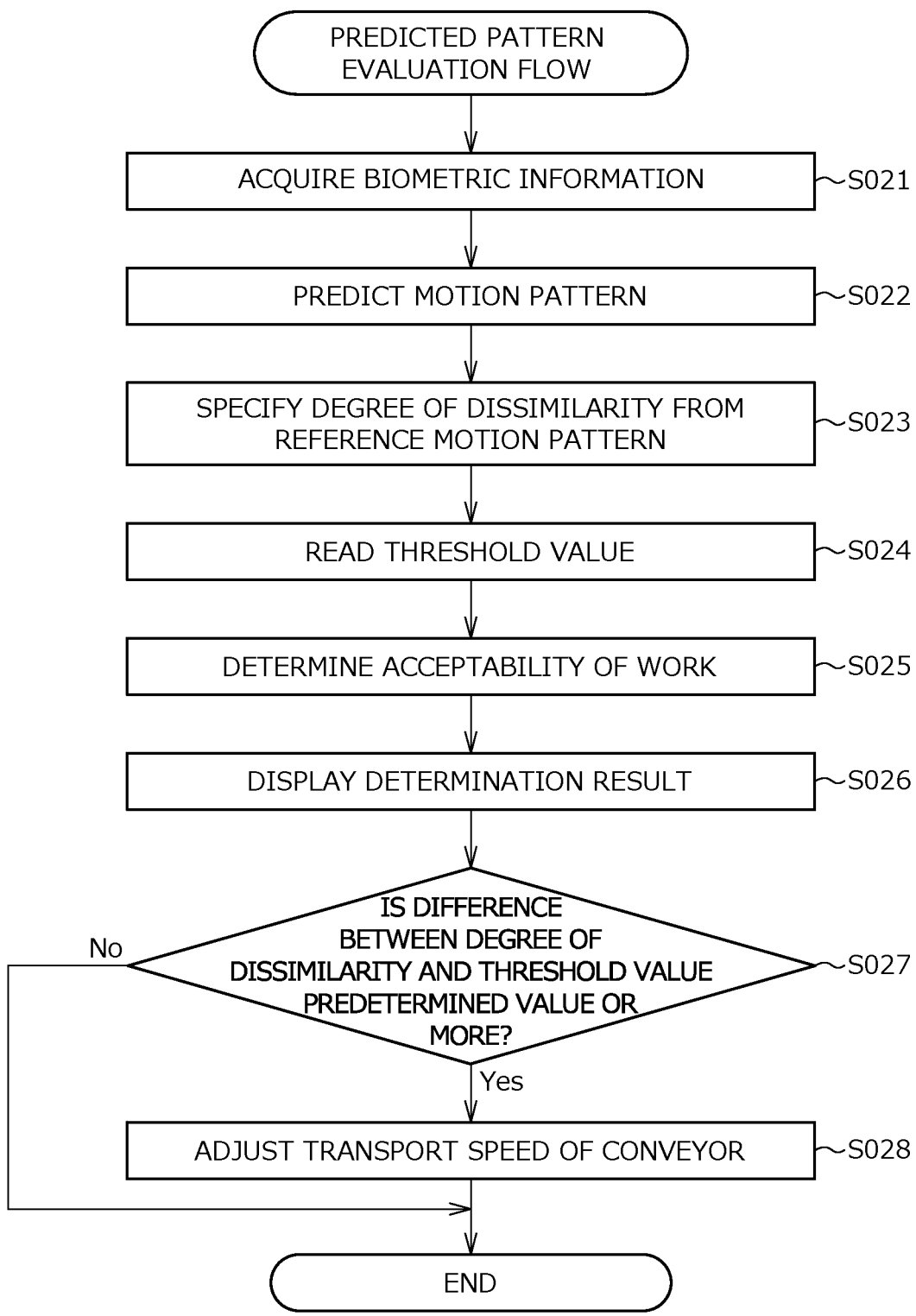
FIG. 7 is a diagram illustrating a flowchart of a predicted pattern evaluation flow according to the first embodiment.

The predicted pattern evaluation flow will be described with reference to FIG. 7. First, the computer 10 acquires the biometric information of the worker P from the measurement sensor S (S021). After that, the computer 10 predicts the motion pattern on the basis of the biometric information acquired in the previous step S021 (S022). In addition, in the method of predicting the motion pattern, as described above, specifically, the motion pattern is predicted on the basis of the correlation between the biometric information and the motion pattern.

After that, the computer 10 specifies the degree of dissimilarity between the predicted pattern and the reference motion pattern (S023). The subsequent steps (S024 to S028) are the same as steps S013 to S017 in the pattern evaluation flow described above, and thus, the description thereof will be omitted. Then, when the predicted pattern evaluation flow is executed according to the above-described procedure, it is assumed that the work X, from which the predicted pattern is acquired in the future, is executed, and the determination result with respect to the acceptability of the work X is predicted and displayed on the display. In addition, in the predicted pattern evaluation flow, similarly to the pattern evaluation flow, the transport speed of the transport conveyor Q is increased in a case where the predicted pattern is different from the reference motion pattern.

The first embodiment of the present invention has been described so far. In this embodiment, learning is performed by using the motion pattern of the worker P acquired in the past and the determination result with respect to the acceptability of the work X that is received as an input for each motion pattern. In addition, in the first embodiment, an evaluation standard (specifically, the threshold value) of the motion pattern is set through learning, the motion pattern is evaluated on the basis of the set evaluation standard, and specifically, the acceptability of the work X from which the motion pattern is acquired is determined. As described above, in the first embodiment, in consideration of the relationship (tendency) between the motion pattern and the determination result with respect to the acceptability of the work X, the acceptability of the work X from which the motion pattern to be evaluated is acquired can be determined in accordance with the relationship.

In addition, in the first embodiment, the evaluation standard is set according to the number of times of execution of the work X that the worker P has executed up to now (number of times of work execution). Specifically, in a case where the number of times of work execution is N or more, the threshold value as the evaluation standard is corrected. As a result, the evaluation standard is set such that the number of times of work execution, in other words, the proficiency level of the worker P with respect to the work X is reflected in the evaluation standard. As a result, it is possible to evaluate the evaluation target pattern in consideration of the proficiency level of the worker P.

Additionally, in the first embodiment, the number of times of work execution is employed as an index of the proficiency level, however the present invention is not limited thereto. As long as an indication is suitable for indicating the proficiency level, other indications may be used. In addition, in the first embodiment, the proficiency level is divided into two levels, and accordingly, the two evaluation standards (specifically, the threshold value before correction and the threshold value after correction) are set for the evaluation standards. However, the present invention is not limited thereto, but the proficiency levels may be divided into three or more levels, and the same number of evaluation standards may be set.

Furthermore, in the first embodiment, the motion pattern is predicted from the measurement result (strictly speaking, the biometric information) of the measurement sensor S, and the predicted motion pattern is evaluated on the basis of the above evaluation standard. Specifically, the case of executing the work X from which the predicted pattern is acquired is assumed, and the acceptability of the work X to be expected in the future is predicted and determined. As a result, it is possible to estimate the acceptability of the work X (that is, the work X before or during execution) from which the motion pattern has not yet been acquired.

Second Embodiment

Next, a second embodiment will be described. In the second embodiment, a computer 10 as a work analysis assistance device has the same configuration as the computer 10 according to the first embodiment and has substantially the same functions as the functions in the first embodiment. Hereinafter, the second embodiment will be described focusing on contents different from those of the first embodiment.

Similarly to the first embodiment, the computer 10 according to the second embodiment includes a video acquisition unit 11, a pattern acquisition unit 12, a reference motion pattern selection unit 13, an input reception unit 14, an evaluation standard setting unit 15, an information acquisition unit 16, a pattern prediction unit 17, a pattern evaluation unit 18, an evaluation result output unit 19, and a machine control unit 20. Among these units, the video acquisition unit 11, the pattern acquisition unit 12, the reference motion pattern selection unit 13, the information acquisition unit 16, the pattern prediction unit 17, the evaluation result output unit 19, and the machine control unit 20 are common to the first embodiment.

On the other hand, in the second embodiment, the evaluation standard setting unit 15 sets a scoring rule as an evaluation standard for a motion pattern, and the pattern evaluation unit 18 calculates a score for the motion pattern as an evaluation for the motion pattern. Specifically, when the input reception unit 14 receives an input of rule decision by an analyst, the evaluation standard setting unit 15 sets a scoring rule on the basis of the rule decision. At this time, the evaluation standard setting unit 15 sets the scoring rule according to the number of times of work execution.

Specifically, the evaluation standard setting unit 15 sets a scoring rule (hereinafter, referred to as a general rule) applied in a case where the number of times of work execution is less than N and a scoring rule (hereinafter, referred to as an expert rule) applied in a case where the number of times of work execution is N or more. Herein, the expert rule is a rule that is stricter than the general rule, for example, a rule with a higher degree of penalty.

The pattern evaluation unit 18 specifies the degree of dissimilarity between the motion pattern (evaluation target pattern) to be evaluated and the reference motion pattern and calculates the score for the evaluation target pattern by applying the specified degree of dissimilarity to the above-described scoring rule. In addition, in the second embodiment, the pattern evaluation unit 18 also calculates the score for the pattern predicted by the pattern prediction unit 17 in the same manner as described above.

Next, an operation example when the computer 10 operates as a work analysis assistance device in the second embodiment will be described. In the second embodiment, similarly to the first embodiment, when the analyst performs an operation of activating the work analysis assistance program, the computer 10 functions as the work analysis assistance device with this activation operation as a trigger. Then, the computer 10 executes a series of information processing in order to evaluate the motion pattern of the worker P in the work X. At this time, the computer 10 executes various types of information processing with respect to the motion pattern evaluation in accordance with the work analysis assistance method according to the present invention.

Specifically, in the second embodiment, after the work analysis assistance program is activated, the two execution modes, specifically the "pattern evaluation mode" and the "predicted pattern evaluation mode" are presented on a designated screen (not illustrated). Then, when the analyst specifies one mode among the presented two execution modes, the computer 10 as the work analysis assistance device executes the information processing corresponding to the specified execution mode. The information processing in each mode will be described below. In the following description, the motion pattern of the worker P in the work X is simply referred to as "motion pattern".

Figure 8:
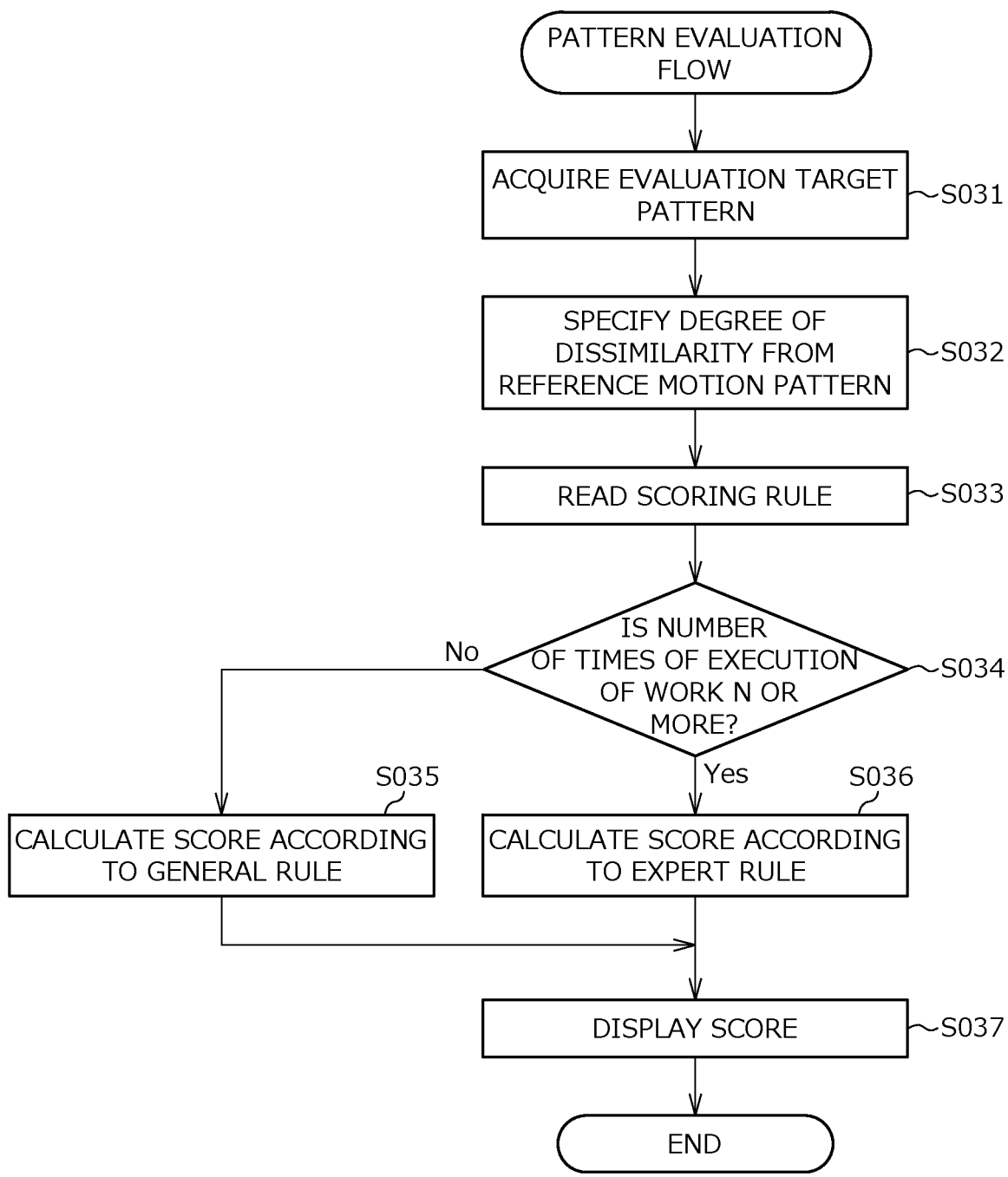
FIG. 8 is a diagram illustrating a flowchart of a pattern evaluation flow according to a second embodiment.

Specifically, in a case where the "pattern evaluation mode" is specified, the computer 10 executes the pattern evaluation flow illustrated in FIG. 8. This process is a process for the computer 10 calculating a score for the motion pattern as an evaluation for the motion pattern to be evaluated.

The pattern evaluation flow according to the second embodiment will be described with reference to FIG. 8. First, the computer 10 analyzes the captured video of the work X newly acquired from the camera R and acquires the motion pattern in the work X as the evaluation target pattern (S031). In addition, the computer 10 specifies the degree of dissimilarity between the evaluation target pattern acquired in the previous step S031 and the reference motion pattern (S032). After that, the computer 10 reads the two scoring rules already set (S033). In addition, the computer 10 specifies the number of times of work execution from the number of motion patterns accumulated in the hard disk drive 10c and determines whether or not the specified number of times of work execution is N or more (S034).

Then, when it is determined that the number of times of work execution is less than N, the computer 10 calculates the score for the evaluation target pattern according to a general rule among the two scoring rules read out in step S033 (S035). On the other hand, when it is determined that the number of times of work execution is N or more, the computer 10 calculates the score for the evaluation target pattern according to an expert rule among the two scoring rules (S036). After the score calculation is completed, the computer 10 displays the calculated score on the display (S037). At the time when the score display is completed, the pattern evaluation flow according to the second embodiment is ended.

Next, the "predicted pattern evaluation mode" will be described. When "predicted pattern evaluation mode" is designated, the computer 10 executes the predicted pattern evaluation flow illustrated in FIG. 9. This process is a process for acquiring the biometric information of the worker P from the measurement sensor S, predicting the motion pattern from the acquired biometric information, and calculating the score for the predicted pattern.

Figure 9:
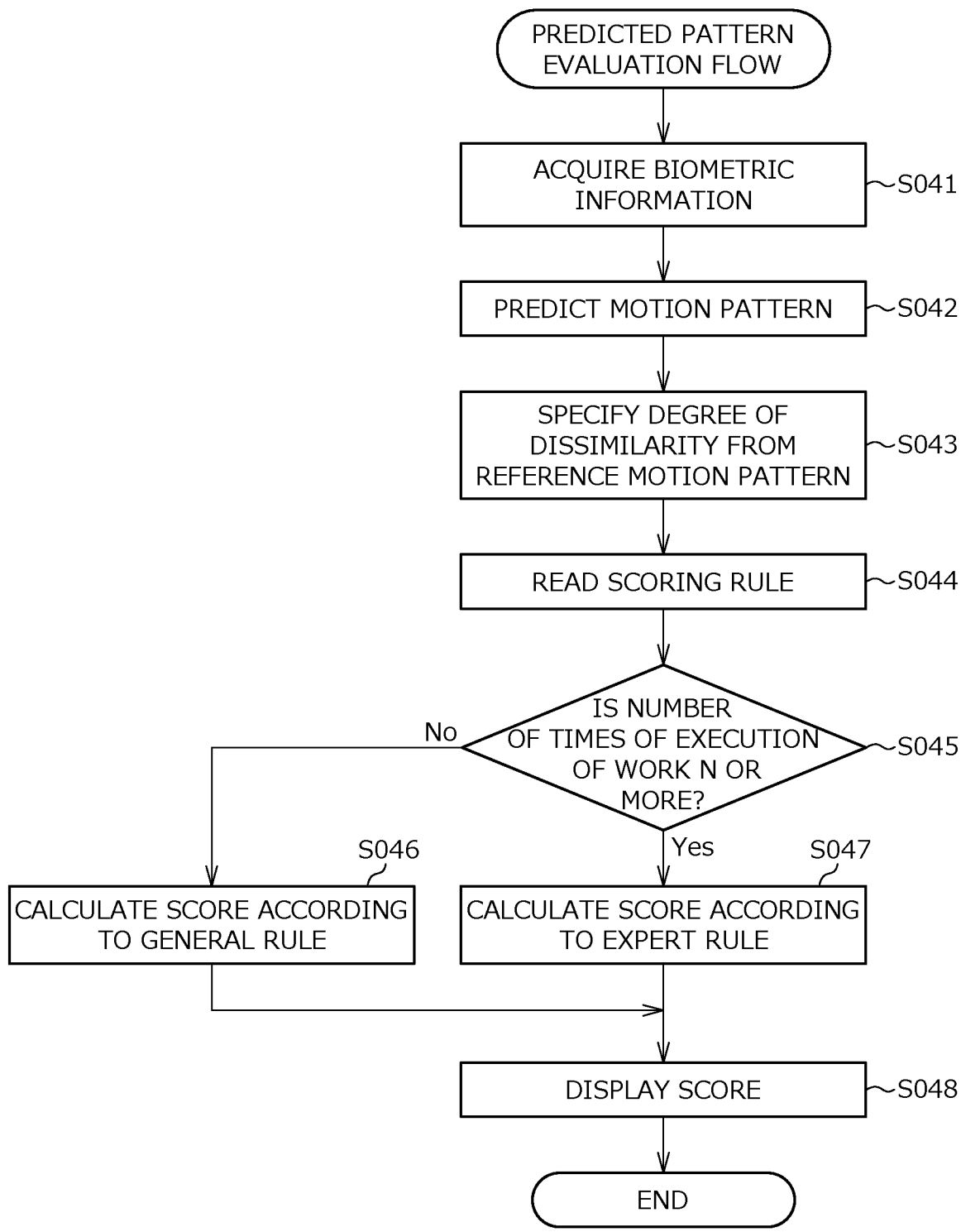
FIG. 9 is a diagram illustrating a flowchart of a predicted pattern evaluation flow according to the second embodiment.

The predicted pattern evaluation flow according to the second embodiment will be described with reference to FIG. 9. First, the computer 10 acquires the biometric information of the worker P from the measurement sensor S (S041). After that, the computer 10 predicts the motion pattern on the basis of the biometric information acquired in the previous step S041 (S042). After the pattern prediction, the computer 10 specifies the degree of dissimilarity between the predicted pattern and the reference motion pattern (S043). The subsequent steps (S044 to S048) are the same as S033 to S037 in the pattern evaluation flow according to the second embodiment described above, and thus, the description thereof will be omitted. Then, when the predicted pattern evaluation flow according to the second embodiment is executed according to the above procedure, finally, the calculation result of the score for the predicted pattern is displayed on the display.

The second embodiment of the present invention has been described so far. In this embodiment, the score for the motion pattern to be evaluated is calculated in accordance with the scoring rule as the evaluation standard. Specifically, the degree of dissimilarity between the evaluation target pattern and the reference motion pattern is specified, and the score is calculated by applying the specified degree of dissimilarity to the scoring rule. As described above, in the second embodiment, the evaluation result for the motion pattern is represented as a numerical value (score). As a result, the worker P can check the evaluation of the worker's own motion with a numerical value (score) and can be given an opportunity to review the worker's own motion from the check result.

In addition, in the second embodiment, similarly to the first embodiment, the evaluation standard is set according to the number of times of execution of the work X that the worker P has executed up to now (number of times of work execution). Specifically, two different scoring rules are prepared, and the scoring rules are used according to the number of times of work execution. Therefore, it is possible to calculate the score for the evaluation target pattern in consideration of the proficiency level of the worker P.

In addition, in the second embodiment, similarly to the first embodiment, the motion pattern is predicted from the measurement result of the measurement sensor S (strictly speaking, the biometric information), and the score for the predicted motion pattern is calculated according to the scoring rule. As a result, for the work X before or during the execution, the motion pattern can be predicted from the biometric information of the worker P, and the evaluation result (specifically, the score) of the predicted motion pattern can be obtained in the step before the execution of the work.

OTHER EMBODIMENTS

The above-described embodiments have been described as examples of the computer program, the work analysis assistance method, and the work analysis assistance device according to the present invention. However, the above-described embodiments are intended to facilitate understanding of the present invention and do not limit the present invention. That is, the present invention can be changed and modified without departing from the spirit of the invention, and equivalents thereof are included in the present invention.

Although one computer 10 realizes all the functions as the work analysis assistance device in the above-described embodiments, the present invention is not limited thereto, and a plurality of computers may be configured to cooperate to realize the work analysis assistance device. In addition, in the above-described embodiments, the motion pattern and various types of information (for example, the determination result with respect to the acceptability of the work X input by the analyst) necessary for evaluating the motion pattern are stored in the hard disk drive 10*c* of the computer 10. However, the present invention is not limited thereto. For example, the motion pattern and the like may be stored in an external server (for example, a server computer for providing a cloud service), and the computer 10 as the work analysis assistance device may be configured to read the motion pattern from the external server as needed.

In addition, in the above-described embodiments (specifically, the first embodiment), in setting the evaluation standard for the motion pattern, the deep learning is performed by using the motion pattern acquired in the past and the determination result with respect to the acceptability of the work X that is received as an input for each motion pattern. That is, in the above-described embodiments, supervised learning is performed as the deep learning. However, the present invention is not limited thereto, and unsupervised learning may be performed as the learning for setting the above-described evaluation standard.

In addition, in the above-described embodiments, in predicting the motion pattern, the biometric information of the worker P measured by the measurement sensor S is acquired. However, the present invention is not limited thereto, and state information (information measured when the worker P executes the work X) other than the biometric information may be acquired. For example, a tilt or posture of the worker P may be measured by the measurement sensor S formed of an acceleration sensor, and information indicating the measurement result may be acquired.

In addition, instead of the state information or together with the state information, the environment information may be acquired. The environment information is information that can be measured with respect to the work environment when the worker P executes the work X. Specifically, the environment information includes temperature, humidity, a noise level, illuminance, presence or absence of a person working with the worker P, the number of persons working with the worker P, and the like. Then, the motion pattern may be predicted on the basis of the acquired environment information.

In addition, although the captured video of the work X is analyzed to acquire the motion pattern in the work X in the above-described embodiments, the present invention is not limited thereto. For example, a motion sensor may be attached to the worker P, and a temporal change in measurement result of the motion sensor during the work X may be acquired as a motion pattern.

In addition, in the above-described embodiments, a case where the work executed by one worker P is an analysis target has been described as an example, but the present invention is not limited thereto. The present invention may also be applied to the case of analyzing the work executed by a plurality of workers (for example, the work executed by the worker P in cooperation with other workers). In such a case, in addition to acquiring the motion pattern for each worker and evaluating the motion pattern of each worker, it is also possible to comprehensively evaluate the motion patterns of the workers as one pattern and evaluate cooperativeness among the workers and achievement as a whole work.

REFERENCE SIGN LIST

10: computer
10*a*: CPU
10*b*: memory
10*c*: hard disk drive
10*d*: I/O port
10*e*: input device
10*f*: output device
11: video acquisition unit
12: pattern acquisition unit
13: reference motion pattern selection unit
14: input reception unit
15: evaluation standard setting unit
16: information acquisition unit
17: pattern prediction unit
18: pattern evaluation unit
19: evaluation result output unit
20: machine control unit
P: worker
Q: conveyor
R: camera
S: measurement sensor
W: packing box

What is claimed is:

1. A work analysis assistance device, comprising:
a pattern acquisition unit that acquires a motion pattern when a worker executes work;
an evaluation standard setting unit that sets an evaluation standard for the motion pattern;
a pattern evaluation unit that evaluates the motion pattern on the basis of the evaluation standard;
an information acquisition unit that acquires biometric information of the worker on a state measured when the worker executes the work;
a pattern prediction unit that predicts the motion pattern on the basis of the information acquired by the information acquisition unit; and
an input reception unit that receives an input of a determination result with respect to acceptability of the work from which the motion pattern is acquired,
wherein the evaluation standard setting unit sets the evaluation standard for the motion pattern when a certain worker executes certain work according to the number of times of work execution of the certain work executed by the certain worker,
wherein the input reception unit receives the input of the determination result for each of the motion patterns acquired by the pattern acquisition unit,
wherein the evaluation standard setting unit sets the evaluation standard by using the motion patterns acquired in the past and the determination result that is received as an input for each of the motion patterns,
wherein the evaluation standard setting unit corrects the set evaluation standard in a case where the number of times of work execution is N or more, wherein N is a natural number of 2 or more, wherein the pattern evaluation unit evaluates the motion pattern predicted by the pattern prediction unit on the basis of the evaluation standard, wherein the pattern evaluation unit determines the acceptability of the work from which the motion pattern is acquired in a case where the number of times of work execution is N or more based on the evaluation standard after correction as an evaluation for the motion pattern, and wherein the pattern evaluation unit determines the acceptability of the work from which the motion pattern is acquired in a case where the number of times of work execution is less than N based on the evaluation standard before correction.

2. The work analysis assistance device according to claim 1, wherein the pattern acquisition unit analyzes a video showing a state where the worker executes the work and acquires the motion pattern.

3. The work analysis assistance device according to claim 1, wherein the pattern evaluation unit calculates a score for the motion pattern as an evaluation for the motion pattern on the basis of the evaluation standard.

4. The work analysis assistance device according to claim 1, wherein the pattern evaluation unit specifies a degree of dissimilarity between the motion pattern and a reference motion pattern and evaluates the motion pattern on the basis of the degree of dissimilarity and the evaluation standard.

5. The work analysis assistance device according to claim 1, wherein the information acquisition unit acquires environment information on an environment where the worker executes the work.

6. A work analysis assistance method comprising:

a computer acquiring a motion pattern when a worker executes work;

the computer setting an evaluation standard for the motion pattern;

the computer evaluating the motion pattern on the basis of the evaluation standard;

the computer acquiring biometric information of the worker on a state measured when the worker executes the work;

the computer predicting the motion pattern on the basis of the information acquired; and the computer receiving an input of a determination result with respect to acceptability of the work from which the motion pattern is acquired, wherein the computer sets the evaluation standard for the motion pattern when a certain worker executes certain work according to the number of times of execution of the certain work executed by the certain worker, wherein the computer receives the input of the determination result for each of the motion patterns acquired by the pattern acquisition unit, wherein the computer sets the evaluation standard by using the motion patterns acquired in the past and the determination result that is received as an input for each of the motion patterns, wherein the computer corrects the set evaluation standard in a case where the number of times of work execution is N or more, wherein N is a natural number of 2 or more, wherein the computer evaluates the motion pattern predicted on the basis of the evaluation standard, wherein the computer determines the acceptability of the work from which the motion pattern is acquired, in a case where the number of times of work execution is N or more based on the evaluation standard after correction as an evaluation for the motion pattern, and wherein, the computer determines the acceptability of the work from which the motion pattern is acquired in a case where the number of times of work execution is less than N based on the evaluation standard before correction.

* * * * *